Nov. 14, 1933.   R. W. WHITTLE   1,935,071
METHOD OF MANUFACTURING BIFURCATED WATER SCREEN
TUBES OR LIKE TUBULAR STRUCTURES
Filed June 15, 1931   3 Sheets-Sheet 1

Reginald W. Whittle
INVENTOR

BY O. V. Thiele
ATTORNEY

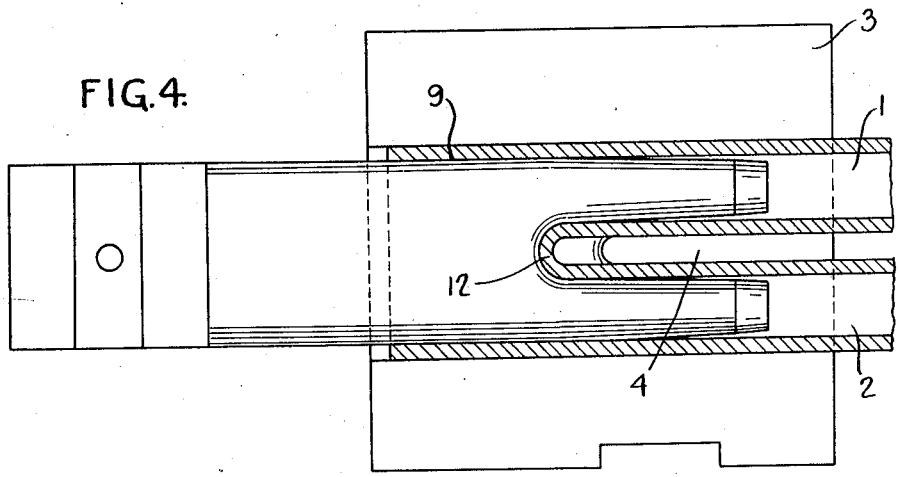
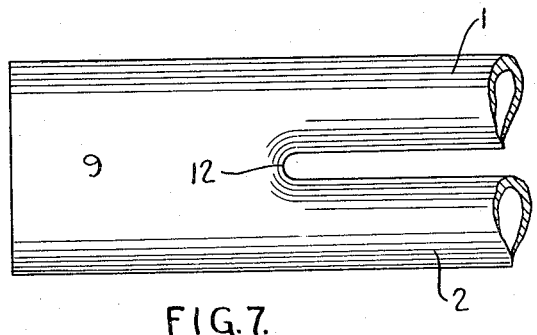
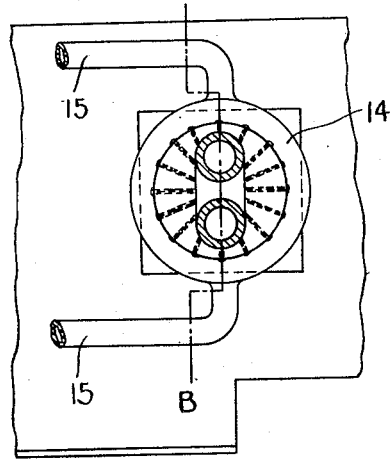
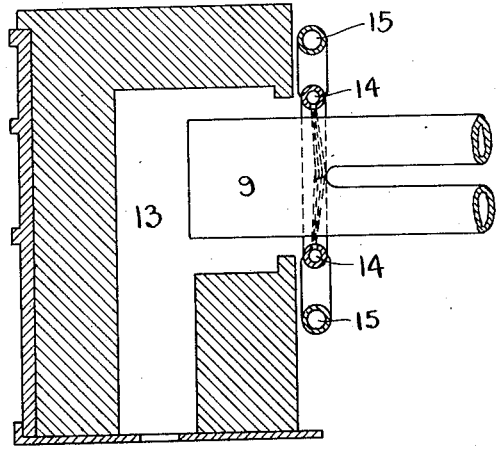

Nov. 14, 1933.　　　R. W. WHITTLE　　　1,935,071
METHOD OF MANUFACTURING BIFURCATED WATER SCREEN
TUBES OR LIKE TUBULAR STRUCTURES
Filed June 15, 1931　　3 Sheets-Sheet 3

Reginald W. Whittle
INVENTOR
BY O. V. Thiele
ATTORNEY

Patented Nov. 14, 1933

1,935,071

UNITED STATES PATENT OFFICE 1,935,071

METHOD OF MANUFACTURING BIFURCATED WATER SCREEN TUBES OR LIKE TUBULAR STRUCTURES

Reginald W. Whittle, Urmston, England, assignor to The Superheater Company, New York, N. Y.

Application June 15, 1931, Serial No. 544,519, and in Great Britain June 17, 1930

3 Claims. (Cl. 29—157.6)

This invention relates to the manufacture of tubular structures of the kind comprising a plurality of juxtaposed pipes united at their adjacent ends into a single tubular union portion for connection to another part, such for example as a header or collector. Tubular structures of this character may be employed in apparatus for various industrial purposes, an example being steam generators in which the furnaces or combustion chambers are lined with tubular water screens; the invention, however, is not restricted to water screen tubes, but extends to multiple pipe structures of the kind indicated for use for any purpose for which they may be suitable.

Where the tubular union portion of a multiple pipe structure has to be finished with a truly cylindrical outer periphery, as for example where it is to be screwed or expanded into a header, sufficient metal must be available in said union portion so that after machining, and it may be threading, ample thickness of metal will obtain to give the required strength.

The present invention has for its object to provide, and consists in, an improved method of manufacturing tubular structures of the kind indicated above whereby it is rendered possible to produce a multiple tube structure in which not only will the constituent tube lengths be effectively united by forge welding, but the forging produced may have a relatively long waist or union portion (hereinafter called a waist portion) of ample thickness to permit the required machining to be satisfactorily performed and yet leave at said waist portion a relatively thick wall. The multiple tube structure is produced, according to this invention, by a series of steps or operations the number of which depends on the length of the waist portion required in the finished tube structure.

Tubular water screens for the furnaces of steam generators frequently comprise more or less vertically disposed juxtaposed tubes connected to upper and lower headers as, for example, by being expanded into holes in the walls of such headers. In order to enable the holes in a header to be arranged in line and sufficiently large imperforate wall portions or bridges to obtain between adjacent holes it is known to employ bifurcated tubes whereby the number of tube ends to be connected to a header is reduced by one half. A construction adapted for this use although shown applied to another use is described in the specification of United States Letters Patent 1,337,486, granted on April 20, 1920, to G. E. Ryder, in which specification also is disclosed the use of tube structures comprising three tubes parallelly disposed and united at their ends and arranged so that when seen in cross section they occupy a triangular space. Such a tube structure will be hereinafter referred to as a triple tube.

Bifurcated tubes have been made by a method or process which comprises the steps of heating the end portion of two juxtaposed tubes, and, by means of dies, slitting the adjacent walls, turning outwardly portions of the tube walls at the slits and welding them together to form a breeches forging, these steps being described in United States Patent 1,169,209 granted on January 25, 1916, to C. H. True et al. Thereafter the waist portion of the breeches forging is swaged down to cylindrical form and machined true. Triple tubes may be manufactured in a similar manner, except of course that the dies employed must be such as to unite three pipes instead of two, dies of this character being known.

Heretofore in the manufacture of bifurcated tubes, to provide a union or waist portion of a desired length, a breeches forging produced by the steps described in said United States Patent 1,169,209 has been reheated, placed in a female die with the crotch of the forging an appropriate distance from the end of the partition and by means of a male die the crotch has been carried further down the tubes, this operation having been repeated until the desired length of waist is obtained; the male dies used in the initial and subsequent forging steps were not provided with forging shoulders.

The present invention principally resides in the improvement in the method of manufacturing tubular structures by uniting a plurality of juxtaposed lengths of tube by forging steps repeated to obtain a desired length of union or waist portion, which consists in the steps of heating the said waist portion whilst cooling the crotch portion of the forging, and whilst holding the forging in a female die with the crotch abutting the partition therein and by means of a male die having an appropriately positioned forging shoulder staving up the waist portion without disturbing the position of or the welding at the crotch of the forging.

The invention further resides in the step, performed prior to the heating and staving-up steps specified in the preceding paragraph, of truing the end of the waist portion of the forging produced by the initial forging operation, or by said operation and one or more repetitions thereof, by cutting off from such forging the notched end portion thereof.

The method of manufacture according to this invention will be described hereinafter with reference to the accompanying drawings as for the manufacture of bifurcated tube structures, it being understood that subject to appropriately formed dies being used the process of making triple or other multiple tube structures according to the invention is identical with that about to be described for making bifurcated tubes.

In the accompanying drawings:—

Fig. 4 is a plan of one-half of the female die employed in the second forging operation, the forging produced by the initial operation and having had its end trued, as hereinafter explained, being shown, in section, in its position prior to the male die being driven home, the male die being shown at the position in its stroke at which it engages the crotch of the forging.

Fig. 5 is an outside view of the forging as it appears after a third forging operation, which is similar to the second operation and may be considered to be a repetition thereof.

Fig. 6 is a front elevation of a portion of a furnace equipped with a water spray means for use in heating the union portion of the forging and in cooling the forging at the crotch portion and in the region of the latter prior to the next forging step in the process, a breeches forging being shown in position in the furnace.

Fig. 7 is a vertical cross section of the furnace and water spray means shown in Fig. 6, the section being taken on the line A—B, Fig. 6.

Figure 1:
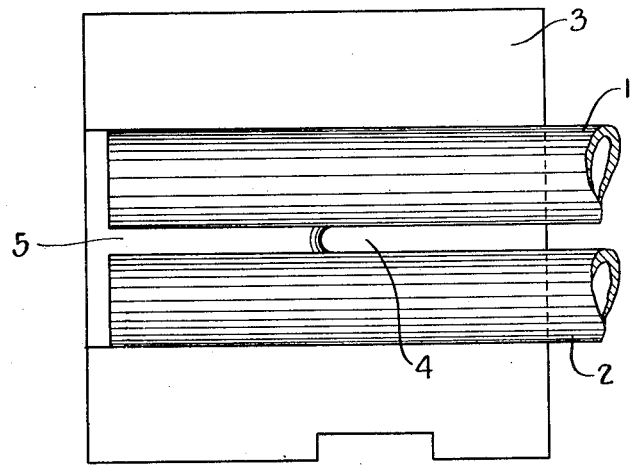
Fig. 1 is a plan of one-half of the female die employed in the first or initial forging step of the process of manufacturing bifurcated tubes according to this invention with the end portions of two pipes in position in the die.
Figure 2:
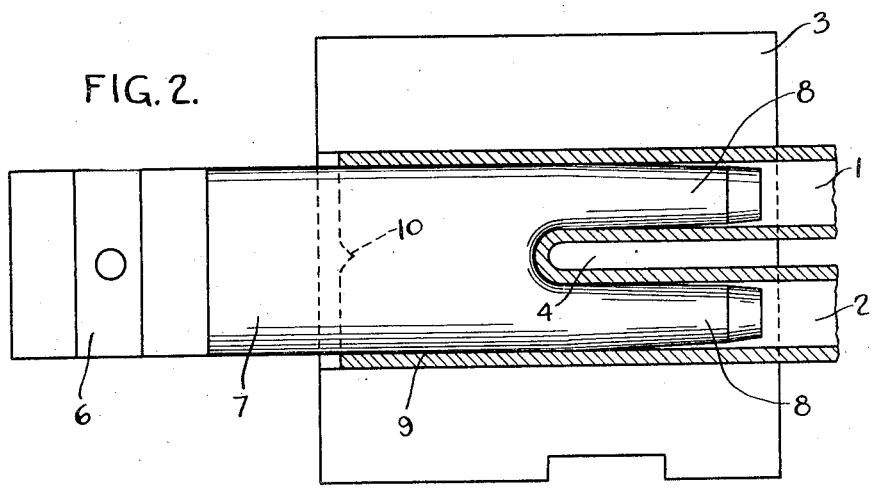
Fig. 2 is a plan of the half-die shown in Fig. 1 showing in section the forging produced by the initial forging operation, the male die employed for this operation being shown in its operated or fully home position.
Figure 3:
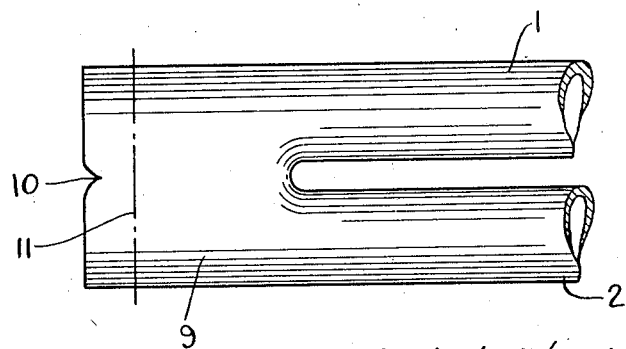
Fig. 3 is an outside view of the forging produced by the initial forging operation.

Referring firstly to Figs. 1, 2 and 3 of the drawings, 1 and 2 are the end portions of two pipes to be joined by forming their ends into a breeches forging, 3 being the lower half of the two-piece female die employed in the initial forging operation. Each half-die is provided with a partition 4 between semi-cylindrical recesses in which the pipes 1 and 2 lie, the partition extending an appropriate distance longitudinally of the die.

The semi-cylindrical recesses in the female die break into a wide recess 5 extending from the end of the partition 4 to the opposite end of the die. The inner end of the partition 4 is curved or rounded as will be clear from Figs. 1 and 2.

The male die shown in Fig. 2 comprises an end portion 6 by which it is secured to the plunger of the press or forging machine (not shown), an intermediate body or waist portion 7, and a bifurcated end portion constituted by the legs 8.

The portion of male die comprising the waist 7 and the legs 8 is slightly tapered, the end portions of the legs being more steeply tapered to facilitate entry of the legs into the pipes 1 and 2.

In carrying out the method or process of making a breeches forging according to this invention the pipes 1 and 2 are clamped together, so that the end portions lie parallel to one another at a distance apart corresponding to the distance between the recesses in the female die. The pipes are then heated and placed in position in the lower half-die 3 as shown in Fig. 1 and the upper die (not shown) is then brought into, and secured in, position.

Whilst the pipes are at forging temperature the male die is driven into the ends of the pipes and the pipes are slit longitudinally, and the portions thereof in the region of the slits are turned outwardly and pressed by the male die against the walls of the recess 5 in the female die and also against the end of the partition 4, the edges of the slit portions of the pipe thereby being welded together.

As thus far described the method or process according to this invention is substantially the same as that described in said United States Patent 1,169,209, except that in the method according to the present invention the male die employed is formed without a forging shoulder. Thus in the initial forging operation the waist portion 9 of the breeches forging is not thickened or staved up.

The initial forging operation leaves in the end of the waist portion 9 a relatively deep notch or V 10 at each of the longitudinal welds, due to the drag of the metal by the male die or punch, and at some stage in the process prior to the staving-up operation hereinafter described the end of the waist portion 9 is trued by cutting off from the end thereof, say on the line 11, Fig. 3, the portion in which the said notches 10 obtain. Preferably the end of the waist portion is trued immediately after the initial forging operation.

To produce a breeches forging having a waist of the required length a forging operation, which may be termed an intermediate forging operation is performed, and such intermediate forging operation may be repeated as many times as may be necessary until the desired length of waist is produced. For an intermediate forging operation the breeches forging is placed in the female die with its crotch portion 12 an appropriate distance from the end of the partition 4 in the die 3, as shown in Fig. 4. By the introduction of the male die the crutch is carried down the tubes 1 and 2 to the extent permitted by the said partition 4 in the female die.

The reheating of the breeches forging for the intermediate forging operation will eliminate any oxide at the initial weld which may have prevented perfect welding of the abutting portions of the tube walls, as well as any oxide from the heated portion generally, so that not only will any necessary completion of the original weld be ensured, but the additional welding effected by the intermediate forging operation be good.

Figure 8:
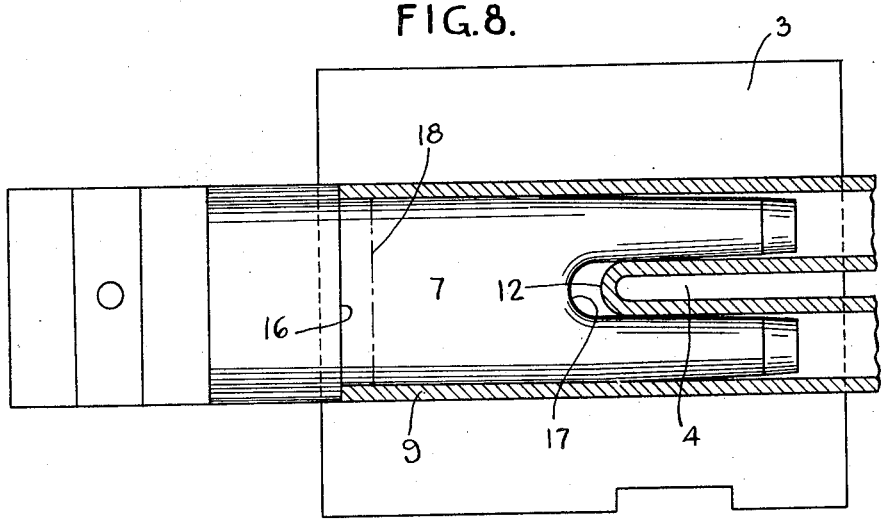
Fig. 8 is a view similar to Fig. 4 showing the male die employed in the staving-up operation at the position in its operative stroke at which it engages the breeches forging and before being driven home.

For the staving-up forging operation the breeches forging is reheated, but as above mentioned the crotch portion is cooled, this cooling preferably being effected by water. Referring to Figs. 6 and 7, which illustrate a furnace with means for cooling the crotch portion of a breeches forging, 13 is the furnace chamber into which the waist portion 9 of the forging extends, and 14 is a hollow ring on the front of the furnace supplied by water through pipes 15 controlled by a valve or valves (not shown). The ring 14 at its inner periphery is perforated to provide a number of jets so that the water is delivered more or less as a spray on to the desired area of the forging. After the waist portion 9 of the breeches forging has been heated to the required temperature, the forging in the region of the crotch having been kept relatively cool, the forging is placed in a female die 3 with the crotch portion 12 abutting the end of the partition 4 in the die as shown in Fig. 8. The male die or punch employed for this operation has a body portion 7 of appropriately smaller cross-section than have the male dies employed for the initial and intermediate forging operations, but if desired the lateral clearance between the wall of the waist and one or both of the dies necessary to permit the thickening of the waist portion might be provided in the female die; or partly in the female die and partly by reducing the cross area of the body portion of the male die. Preferably, however, all the clearance required is provided by appropriately dimensioning the male die. The male die employed in this operation has a forging shoulder 16 appropriately positioned in relation to the crotch 17 of the die, the length of the die between the said shoulder and crotch being less by the desired amount than the length of the waist 9 of the forging, from the crotch 12 to the open end of the forging, as will be seen in Fig. 8. By driving home the male die the action of the forging shoulder 16 on the end surface of the waist portion 9 of the forging the wall of the said waist portion will be thickened or staved-up. This staving-up will shorten the waist portion, as will be understood, the extent of the reduction in length effected being shown by the line 18, Fig. 8, which indicates the end surface of the waist portion when the male die has been driven home. Owing to the cooling of the crotch 12 of the forging, and of the forging generally in the region of the crotch, the position of and welding at the said crotch 12 will not be disturbed by the staving-up operation.

Each of the initial and intermediate forging operations is performed by a single blow or stroke of the male die, and usually a single stroke of the male die only is required to stave-up or thicken the wall of the waist of the breeches forging to the desired extent.

Figure 9:
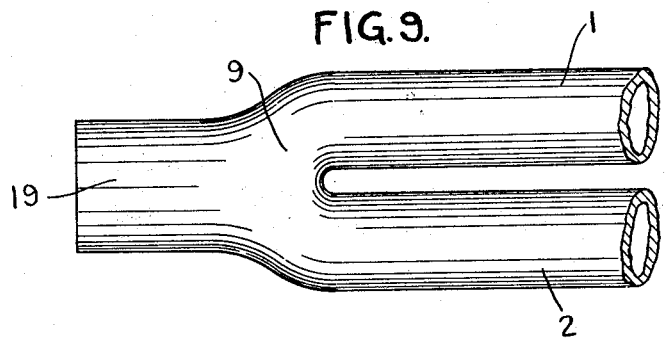
Fig. 9 is an outside view of the breeches forging after the waist portion has been swaged down to cylindrical formation for the desired portion of its length.

After the staving-up operation the waist portion 9 is swaged, in a known manner, to cylindrical form as shown at 19, Fig. 9, and may then be machined, and it may be threaded, as may be desired, ample thickness of metal being available for the purpose.

The water jet ring 14 shown in Figs. 6 and 7 and employed for cooling the forging in the region of the crotch might be fed with water by a single pipe, if desired, but it is preferred to employ two pipes, as shown, to obtain a feed of water to both the top and bottom of the ring, each pipe being equipped with a manually operable control valve. Also in the bore of the cooling ring 14 partitions (not shown) may be provided on the horizontal diameter of the ring to divide the water supplied by the upper and lower pipes 15 to the respective segments of the ring and assist in obtaining the desired distribution of water on the forging.

I claim:

1. The improvement in manufacturing tubular structures of the kind referred to comprising the steps of uniting two pipes by a weld to form an incomplete open-ended return-bend, and, while the return-bend is still open, heating the walls of the structure from the open end inward, cooling the portions of the structure in and adjacent to the crotch, placing the structure with the crotch engaging an abutment and upsetting the portions outward from the crotch by pressure applied to the end.

2. The improvement in manufacturing tubular structures of the kind referred to comprising the steps of uniting two pipes by weld to form an incomplete open-ended return-bend, and while the return-bend is still open heating the walls of the structure from the open end inward, cooling the portions of the structure in and adjacent to the crotch, placing the structure with the crotch engaging an abutment, and exerting pressure on the end of the structure to upset the portions outward from the crotch while supporting the wall both on the inside and outside.

3. The improvement in manufacturing tubular structures of the type described comprising the steps of clamping two pipes in the relative position they are to occupy in the completed structure, heating them to welding heat over the portions to be operated on, splitting the juxtaposed walls inward from the end, bending out the walls adjacent to said splits, welding the edges so formed together, repeating these steps so as to extend the waist portion so formed to the desired length, squaring off the end, heating the whole waist portion, cooling the metal in the crotch, placing the structure with the crotch engaging an abutment, and upsetting the waist portion while supporting its wall on the inside and outside.

REGINALD W. WHITTLE.